(12) United States Patent
Lebel

(10) Patent No.: US 10,915,990 B2
(45) Date of Patent: Feb. 9, 2021

(54) SYSTEMS AND METHODS FOR DENOISING MEDICAL IMAGES WITH DEEP LEARNING NETWORK

(71) Applicant: GENERAL ELECTRIC COMPANY, Schenectady, NY (US)

(72) Inventor: Robert Marc Lebel, Calgary (CA)

(73) Assignee: General Electric Company, Schenectady, NY (US)

( * ) Notice: Subject to any disclaimer, the term of this patent is extended or adjusted under 35 U.S.C. 154(b) by 117 days.

(21) Appl. No.: 16/164,634

(22) Filed: Oct. 18, 2018

(65) Prior Publication Data
US 2020/0126190 A1    Apr. 23, 2020

(51) Int. Cl.
| | |
|---|---|
| G06T 5/00 | (2006.01) |
| G06K 9/62 | (2006.01) |
| G06T 7/00 | (2017.01) |
| G06K 9/46 | (2006.01) |
| G06K 9/40 | (2006.01) |
| G06K 9/66 | (2006.01) |
| G06K 9/52 | (2006.01) |

(52) U.S. Cl.
CPC ............... *G06T 5/002* (2013.01); *G06K 9/40* (2013.01); *G06K 9/6242* (2013.01); *G06K 9/66* (2013.01); *G06T 7/0012* (2013.01); *G06K 9/527* (2013.01); *G06T 2207/10081* (2013.01); *G06T 2207/10088* (2013.01); *G06T 2207/20081* (2013.01)

(58) Field of Classification Search
USPC .................................................. 382/100–312
See application file for complete search history.

(56) References Cited

U.S. PATENT DOCUMENTS

| | | | | |
|---|---|---|---|---|
| 5,594,767 | A * | 1/1997 | Hsieh .................... | G06T 5/004 378/8 |
| 6,823,089 | B1 * | 11/2004 | Yu ............................ | G06T 5/10 375/E7.19 |
| 10,043,243 | B2 | 8/2018 | Matviychuk et al. | |
| 10,096,109 | B1 | 10/2018 | Zaharchuk et al. | |
| 2006/0147101 | A1 * | 7/2006 | Zhang ...................... | G06T 5/30 382/131 |
| 2014/0132694 | A1 * | 5/2014 | Shacham ............... | G03G 21/043 347/110 |
| 2016/0058408 | A1 * | 3/2016 | Kim ......................... | G06T 7/11 382/131 |
| 2017/0148158 | A1 * | 5/2017 | Najarian ............... | A61B 5/7203 |
| 2018/0240219 | A1 * | 8/2018 | Mentl ..................... | G06T 11/008 |
| 2019/0142390 | A1 * | 5/2019 | Luo ...................... | A61B 8/5215 |
| 2019/0147588 | A1 * | 5/2019 | Rowley Grant ........ | G06T 5/002 382/131 |
| 2020/0162678 | A1 * | 5/2020 | Rotte ..................... | H04N 5/341 |

* cited by examiner

*Primary Examiner* — Marcellus J Augustin

(57) ABSTRACT

Methods and systems are provided for selectively denoising medical images. In an exemplary method, one or more deep learning networks are trained to map corrupted images onto a first type and a second type of artifacts present in corresponding corrupted images. Then the one or more trained learning networks are used to single out the first and second types of artifacts from a particular medical image. The first type of artifacts is removed to a first extent and the second type of artifacts is removed to a second extent. The first and second extents may be different. For example, one type of artifacts can be fully suppressed while the other can be partially removed form the medical image.

18 Claims, 5 Drawing Sheets

SYSTEMS AND METHODS FOR DENOISING MEDICAL IMAGES WITH DEEP LEARNING NETWORK

TECHNICAL FIELD

Embodiments of the subject matter disclosed herein relate to medical imaging, such as magnetic resonance imaging (MRI), and more particularly, to reducing artifacts in medical images.

BACKGROUND

Medical imaging systems such as magnetic resonance imaging (MRI) systems, computed tomography (CT) systems, positron emission tomography (PET) systems, X-ray systems, ultrasound systems, etc., are widely used to obtain internal physiological information of a subject (e.g., a patient). Medical images obtained by these imaging modalities may feature artifacts from various sources, such as blurring, ringing, noise, and so on. Artifacts may be confused with a pathology or may reduce the quality of examinations. Deep learning approaches have been proposed for addressing image artifacts in many different ways, including denoising, in-painting, deblurring, super-resolution, contrast manipulation, among others. Exploring the deep learning techniques to identify new ways for intelligently improving the acquired image quality is generally desired.

SUMMARY

In one embodiment, the present disclosure provides a method for selectively denoising a medical image. The method comprises singling out a first type and a second type of artifacts from the medical image by using one or more trained deep learning networks; removing the first type of artifacts to a first extent; and removing the second type of artifacts to a second extent.

In another embodiment, the present disclosure provides a system for denoising a medical image. The system comprises a memory storing a first scale factor and a second scale factor and a processor communicably coupled to the memory. The processor is configured to single out a first type and a second type of artifacts from the medical image by using one or more trained deep learning networks, remove the first type of artifacts according to the first scale factor, and remove the second type of artifacts according to the second scale factor.

BRIEF DESCRIPTION OF THE DRAWINGS

Various aspects of this disclosure may be better understood upon reading the following detailed description and upon reference to the drawings in which.

Figure 1:
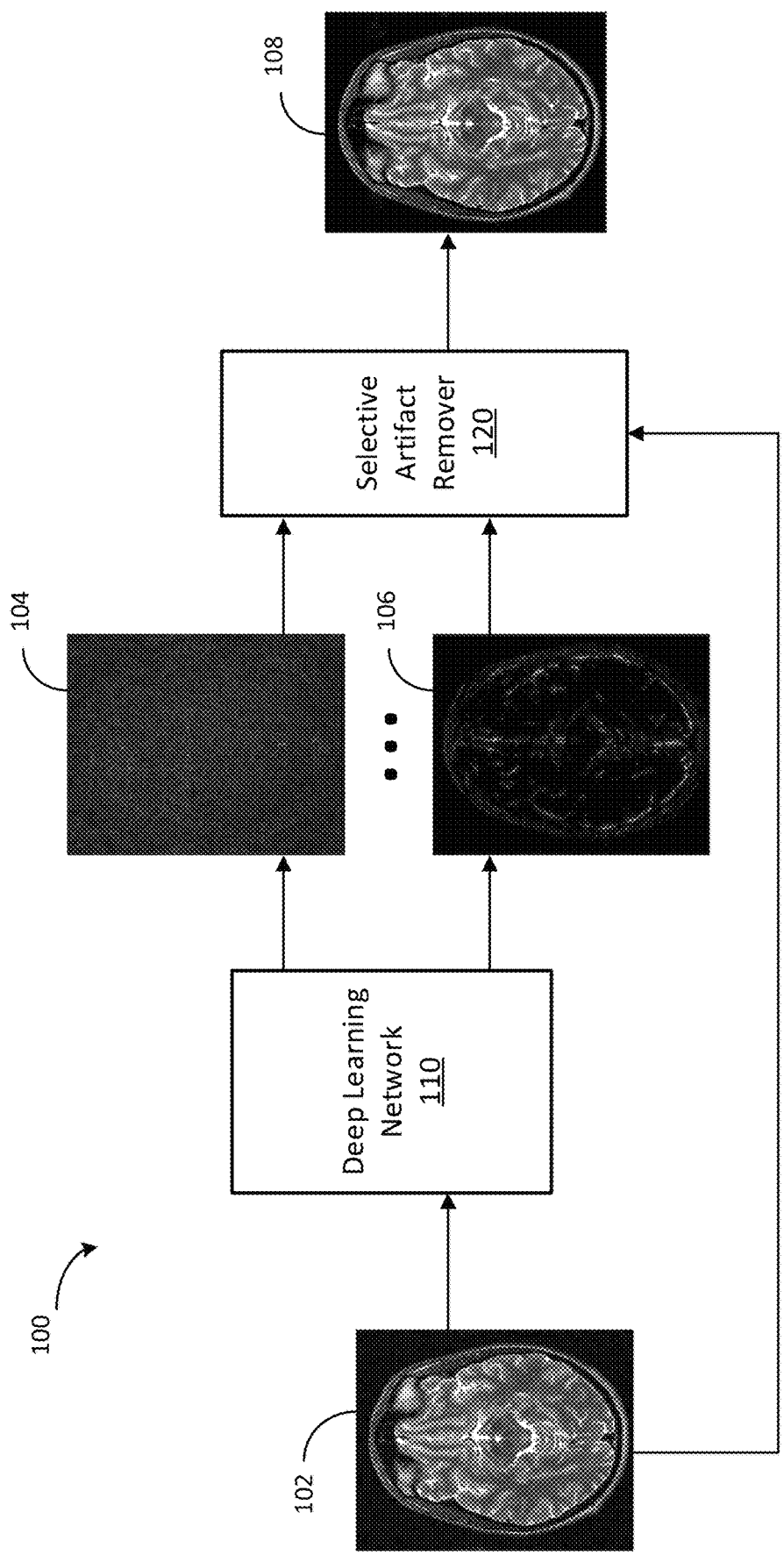
FIG. 1 is a schematic diagram illustrating a system for selectively denoising a medical image, according to an exemplary embodiment.

The drawings illustrate specific aspects of the described systems and methods for selectively denoising a medical image by using one or more deep neural networks. Together with the following description, the drawings demonstrate and explain the principles of the structures, methods, and principles described herein. In the drawings, the size of components may be exaggerated or otherwise modified for clarity. Well-known structures, materials, or operations are not shown or described in detail to avoid obscuring aspects of the described components, systems and methods.

DETAILED DESCRIPTION

The following description relates to various embodiments for denoising medical images by using a deep neural network. Medical images obtained by imaging modalities (e.g., MRI, CT, PET, X-ray, ultrasound, etc.) may feature artifacts (also known as corruption) from various sources, such as noise, blurring, ringing, and so on. As used herein, artifacts refer to features appearing in an image that is not present in the subject under examination. Typically, a medical image is corrupted by multiple factors during its acquisition, some affecting the diagnostic quality, while others may be confused with pathology. In some situations, it is desirable to fully suppress some types of artifacts (e.g., ringing) while partially remove other types of artifacts (e.g., noise) depending on, for example, the applications. This disclosure describes using one or more deep learning networks to single out multiple types of artifacts from a medical image, and thus enabling selective removal of different types of artifacts to different extents. As such, numerous dependent or independent image characteristics can be jointly estimated to selectively enhance images.

Referring to FIG. 1, a system 100 for selectively denoising a medical image 102 is shown, according to an exemplary embodiment. A deep learning network 110 has been trained to single out various types of artifacts from medical images. The layout and training process of deep learning network 110 will be discussed below in detail with reference to FIGS. 2-4. The deep learning network 110 singles out a first type of artifacts 104, e.g., noise, and a second type of artifacts 106, e.g., ringing, from the input image 102. A selective artifact remover 120 is configured to remove the first type of artifacts 104 and the second type of artifacts 106 to certain extents from the input image 102. In some embodiments, the first and second types of artifacts 104 and 106 are removed to different extents, for example, one type is fully suppressed while the other type is partially removed. Although two types are shown in FIG. 1 for illustration, it should be understood that the methods and systems disclosed herein can apply to more than two types of artifacts.

The input medical image 102 may be acquired by any appropriate imaging modality, such as MRI, CT, PET, X-ray, ultrasound, etc., and may be any appropriate type of image. Take MRI as an example. The input image 102 may be a magnitude image, phase image, "real value" image, "imaginary value" image, or "complex value" image, meaning that each pixel in image 102 reflects magnitude, phase, real value, imaginary value, or complex value of the MR signal at corresponding location. In some embodiments, the input image 102 is obtained by performing Fourier transform on acquired k-space data. In some embodiments, the acquired k-space data is pre-processed (e.g., autocalibrated) before the Fourier transform. In some embodiments, the input image 102 is obtained by further processing the Fourier transformed dataset, which may include any appropriate processing (or combination thereof) in the reconstruction pipeline, such as sensitivity encoding (e.g., array coil spatial sensitivity encoding), water-fat separation, gradient nonlinearity correction, and so on. The input image 102 may be of any appropriate size, for example, 128×128 pixels, 256×256 pixels, 512×512 pixels, and so on. Although MRI is used herein as an example for the input image 102, it should be understood that the principle applies to images acquired via other imaging modalities as well.

Various types of artifacts may be introduced during the acquisition of input image 102 due to multiple factors. For example, artifacts may be caused by voluntary and/or physiologic motion of the patient under examination. Random motion such as the patient's voluntary moving may produce a smear (or blurring) in an MR image. Periodic motion such as respiratory or cardiac/vascular pulsation may produce discrete ghosts in an MR image.

Artifacts known as "alias" in MRI are caused by inadequate digital sampling rate. If a signal is not sampled fast enough, its true frequency would be underestimated and indistinguishable from another signal having the true lower frequency. Phase wrap-around is a particular manifestation of alias, which occurs when the dimensions of an object exceed the defined field-of-view (FOV). In wrap-around artifact, objects located outside the FOV appear at the opposite side of the image, as if one took the image and wrapped it around a cylinder.

Artifacts known as "Gibbs ringing" in MRI are caused by incomplete digitization of the MR echo, i.e., the signal has not decayed to zero by the end of the acquisition window. Gibbs ringing features a series of lines parallel to a sharp intensity edge in an MR image, such as the CSF-spinal cord and the skull-brain interface, which may appear in phase encoding direction and/or frequency encoding direction.

"RF noise" artifacts are caused by failure of the RF shielding that prevents external noise from getting into the detector. The form of RF noise in an MR image depends on the source of noise and where it is introduced into the signal. For example, a bright spot somewhere in the image may be caused by a single frequency leaking into the signal.

In MRI, images may also be corrupted by random thermal and/or electronics noise, for example, complex-valued, white, Gaussian/Rician noise. It should be understood that the artifacts discussed above are for illustration not for limitation. This disclosure envisions other types of MRI artifacts (e.g., flow artifacts, chemical shift, spatial warping, etc.) and artifacts of other imaging modalities, such as streaking, noise, beam hardening, and scatter in CT images and acoustic reverberation, noise, speckle, streaking, and blurring in ultrasound images.

The deep learning network 110 has been trained to single out multiple types of image artifacts, for example, the first type 104 and second type 106. 104 and 106 are also referred to as first and second residuals, respectively. The deep learning network 110 may be stored at the imaging device, an edge device connected to the imaging device, a cloud in communication with the imaging device, or any appropriate combination thereof.

The selective artifact remover 120 is configured to selectively remove various types of artifacts output from the deep learning network 110 from the input image 102 to obtain an enhanced image 108. In some embodiments, the artifacts are removed according to the following equation:

$$E(x,y)=I(x,y)-\lambda_1 A_1(x,y)-\lambda_2 A_2(x,y),$$

where $E(x,y)$ is the pixel value at location $(x,y)$ of the enhanced image 108, $I(x,y)$ is the pixel value of the input image 102, $A_1(x,y)$ and $A_2(x,y)$ are the pixel values of the first and second residuals 104 and 106, respectively. $\lambda_1$ is the first scale factor for the first residual 104, and $\lambda_2$ is the second scale factor for the second residual 106. It should be understood that although two scale factors are used herein for illustration, more scale factors may be used for more types of residuals. $\lambda_1$ and $\lambda_2$ can be of different values, and thus the first and second types of artifacts can be removed to different extents. In some embodiments, $\lambda_1$ and $\lambda_2$ can be any value in the range of [0, 1]. If, for example, $\lambda_1=1$, $\lambda_2=0.5$, the first type of artifacts (e.g., noise) is fully suppressed while the second type of artifacts (e.g., ringring) is partially removed.

In some embodiments, at least one of the scales factors $\lambda_1$ and $\lambda_2$ may vary for different pixels across the image rather than remaining the same for each pixel. For example, $\lambda_1$ and/or $\lambda_2$ may be set at a first value (e.g., 1) for pixels in some portions of the image while at a second value (e.g., 0) for pixels in other portions of the image. $\lambda_1$ and/or $\lambda_2$ may be set so that residual with higher value is removed to a higher extent than residual with lower value, or vice versa. For example, the scale factor can be set as follows:

$$\lambda_1(x,y) = \frac{A_1^2(x,y)}{A_{1,max}^2},$$

where $A_{1,max}$ is the maximum pixel value in residual 104, and thus, the residual with higher value is removed to a higher extent than residual with lower value. It should be understood that the scales factor functions discussed above are for illustration not for limitation. $\lambda_1$ and $\lambda_2$ may adopt any appropriate functions.

In some embodiments, the scale factors are specified by an operator during acquisition of images. In some embodiments, the scale factors are pre-defined depending on the applications, such as anatomy, pulse sequence, etc. For example, if radial sampling of k-space data is used, the scale factor for motion blurring may be set at a low value or zero. If Cartesian sampling of k-space data is used, the scale factor for motion blurring may be set at a high value or one. In some embodiments, the scale factors are adapted/learned according to a model. For example, the scale factor associated with random noise may be adapted for various scanning parameters (e.g., FOV, bandwidth, etc.) according to a thermal/electronics noise model for the imaging device.

In some embodiments, one or more further reconstruction processing may be performed on the enhanced image 108. For example, interpolation can be done to obtain a high-resolution image.

The selective artifact remover 120 may run on the imaging device, an edge device connected to the imaging device, or a cloud in communication with the imaging device. The selective artifact remover 120 and the deep learning network 110 may be located at the same device, or different devices.

Figure 2:
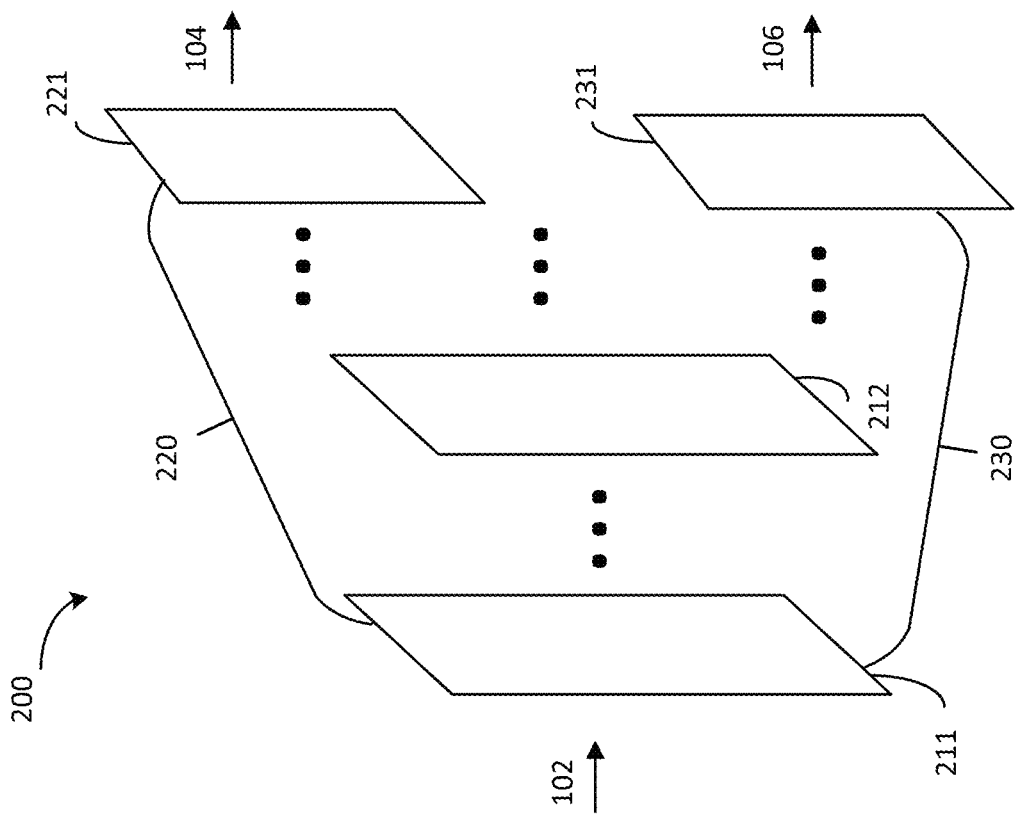
FIG. 2 is a schematic diagram illustrating the layout of a deep learning network which can be used in FIG. 1, according to an exemplary embodiment.

Now referring to FIG. 2, a schematic diagram of a deep learning network 200 is shown according to an exemplary embodiment. The deep learning network 200 can be used as the deep learning network 110 in FIG. 1. As shown in FIG. 2, the deep learning network 200 includes multiple convolutional layers, each layer having one or more input channels and one or more output channels. Each convolutional layer is made up of "neurons" (also known as "nodes") with learnable weights and biases. Each neuron receives several inputs, takes a weighted sum over them, passes it through an activation function and responds with an output.

Figure 3:
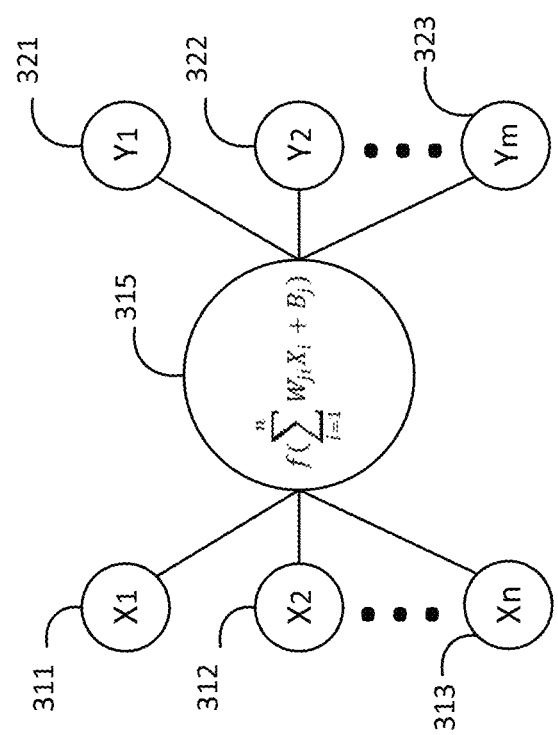
FIG. 3 is a schematic diagram illustrating two adjacent convolutional layers of a deep learning network, according to an exemplary embodiment.

FIG. 3 shows connections between two adjacent convolutional layers in accordance with an exemplary embodiment. The preceding layer has n neurons 310, 312, ..., 313 with values of $X_1, X_2, \ldots X_n$ respectively; the subsequent layer has m neurons 321, 322, ... 323 with values of $Y_1, Y_2, \ldots Y_m$ respectively. The relationship between the two adjacent layers may be described as follows:

$$Y_j = f\left(\sum_{i=1}^{n} W_{ji} X_i + B_j\right)$$

Where $X_i$ is the i-th neuron of the preceding layer, $Y_j$ is the j-th neuron of the subsequent layer, $W_{ji}$ is the weight, and $B_j$ is the bias. In some embodiments, the activation function $f$ is a rectified linear unit (ReLU) function, for example, plain ReLU function, leaky ReLU function, parametric ReLU function, etc.

Referring back to FIG. 2, the input image 102 is received by the first convolutional layer 211. In some embodiments, the input image 102 is processed by one or more pooling layers (not shown in the present figure) before input to layer 211. The one or more pooling layers perform downsampling operations to transform the input image 102 made of pixels (e.g., 128×128 pixels, 256×256 pixels, etc.) to a multi-channeled image (4 channels for example) appropriate for input to first convolutional layer 211. In some embodiments, no pooling layers are needed.

The deep learning network 200 includes two branches 220 and 230 of convolutional layers, the first branch 220 mapping the input image 102 to the first artifact image 104 and the second branch 230 mapping the input image 102 to the second artifact image 106. The first and second branches 220 and 230 share one or more convolutional layers (e.g., 211 through 212). In some embodiments, there are one or more hidden convolutional layers between layers 211 and 212. The two branches 220 and 230 diverge from layer 212. In further embodiments, there may be one or more hidden convolutional layers between layer 212 and the output layer 221 of the first branch 220 and/or between layer 212 and the output layer 231 of the second branch 230. It should be understood that although two branches are shown in FIG. 2 for illustration, the deep learning network may include more than two branches for extracting and outputting various artifacts. In some embodiments, the output may be processed by one or more upsampling layers which transform multi-channeled images to images of pixels.

In some embodiments, the deep learning network 200 is a residual network. In further embodiments, the residual network may include skip connections that pass the output of an earlier layer directly to one or more subsequent but not adjacent layers. As such, feature maps of the convolutional layers are concatenated. It should be understood that the layout of deep learning network shown in FIG. 2 is for illustration not for limitation. Any other appropriate configuration can be used herein.

The deep learning network 200 may be trained using corrupted medical images and artifacts present in corresponding images. In some embodiments, the corrupted medical images may be synthesized images. For example, one or more types of artifacts may be added to a medical image with good quality (e.g., relatively clean image) to obtain a synthesized corrupted image. The synthesized corrupted image is used as input image 102, and the added one or more types of artifacts as outputs 104 and 106 to train the deep learning network 200.

For example, to train the deep learning network 200 to process MR images, the artifacts may include for example, random noise, spatial warping, additional pathology, additional blurring, additional ringing, etc. As another example, for training the deep learning network 200 to process ultrasound images, the artifacts may include acoustic reverberation, spatial shading, random noise, speckle, additional pathology, additional blurring, spatial warping, etc. For training the deep learning network 200 to process CT images, the artifacts may include streak artifacts, random noise, beam hardening, scatter, ring artifacts, additional pathology, additional blurring, etc.

For example, noise can be added to a clean image to generate the synthesized image. The specific type of noise may depend on the imaging modality. Mathematically, this corresponds to:

$$I_s = I + \epsilon,$$

where $I_s$ is the synthesized image with additive noise, I is the clean image, and $\epsilon$ is the additive noise. In MRI, for example, images may be corrupt with complex-valued, white, Gaussian noise. In magnitude or ultrasound images, the noise may comprise Rician noise. In CT imaging, the noise may comprise Poisson noise. To that end, the additive noise $\epsilon$ may be modeled according to Gaussian, Rician, and Poisson distributions for MR, ultrasound, and CT imaging modalities respectively. In some embodiments, the added noise may be pseudo-random instead of truly random. The synthesized image $I_s$ is used as input image 102, and the additive noise $\epsilon$ is used as the output 104 to train the deep learning network 200.

As another example, Gibbs ringing can be introduced to a high resolution image by downsampling the image. Specifically, an image with Gibbs ringing is generated from a high resolution image free of Gibbs ringing by retrospectively reducing the acquisition window to a point where the signal is non zero. The image with Gibbs ringing is used as input 102, and the difference between the image with Gibbs ringing and the image without Gibbs ringing is used as the output 106 to train the deep learning network 200.

After training the deep learning network 200, it may thus be used to process medical images acquired by an imaging device. Because the two branches 220 and 230 for different types of artifacts share one or more convolutional layers, the two branches can interact with and be impacted by each other, making the training results more favorable.

Figure 4:
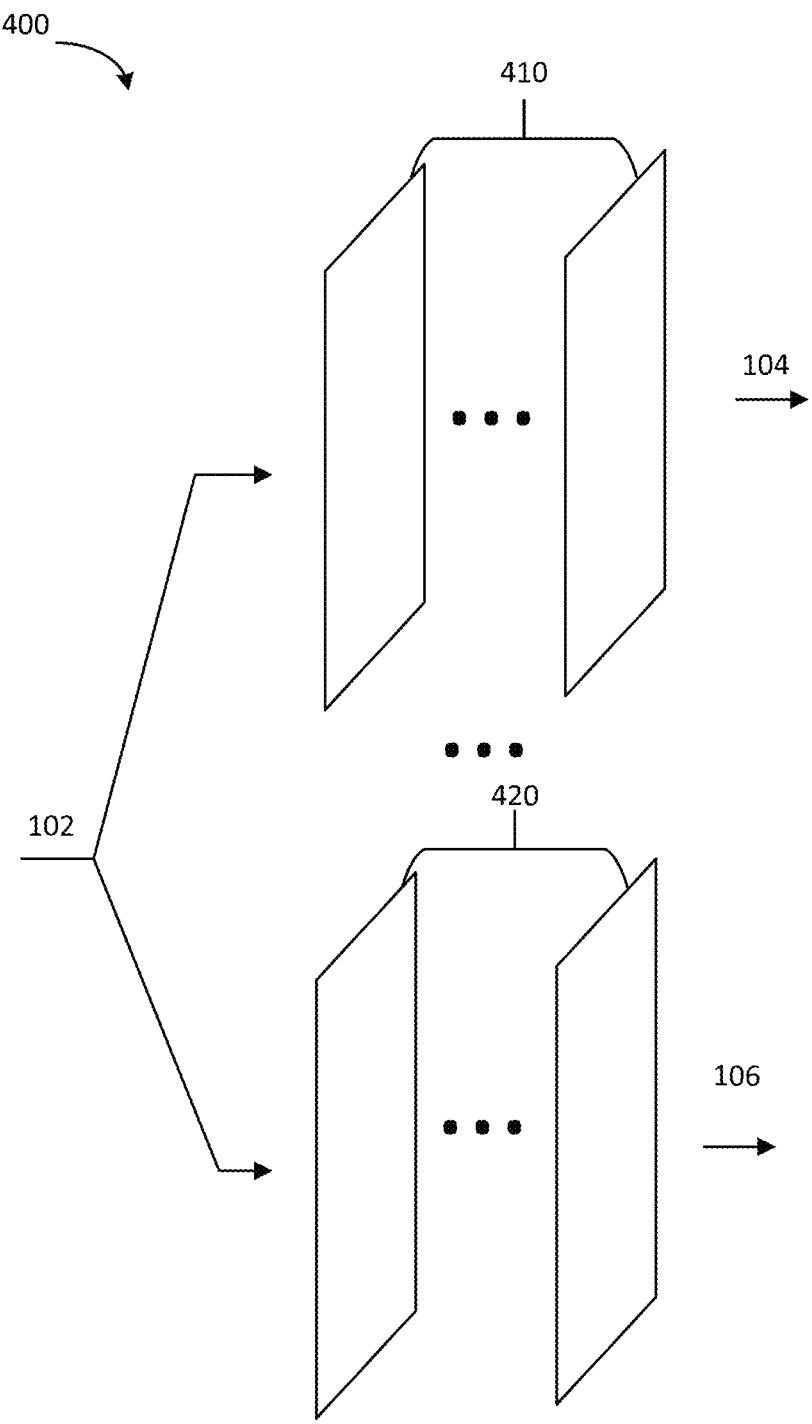
FIG. 4 is a schematic layout of a deep learning network which can be used in FIG. 1, according to another exemplary embodiment.

Referring to FIG. 4, schematic layout of a deep learning network 400 is shown according to another exemplary embodiment. The deep learning network 400 can be used as deep learning network 110 in FIG. 1. As shown in FIG. 4, the input image 102 is received, at the beginning of process, by two branches 410 and 420 of the network 400. At the first branch 410, the input image 102 is processed by multiple convolutional layers. The first branch 410 extracts and outputs characteristics related to the first type of artifacts (e.g., noise). At the second branch 420, the input image 102 is processed by multiple convolutional layers. The second branch 420 extracts and outputs characteristics related to the second type of artifacts (e.g., ringing). It should be understood that although two branches are shown in FIG. 4 for illustration, there may be more than two branches for extracting and outputting characteristics related to various types of artifacts.

The deep learning network 400 may be trained using corrupted medical images and artifacts present in corresponding images. As discussed above, in some embodiments, the corrupted medical images may be synthesized images. Because the two branches do not share convolutional layers, they can be trained independently.

Figure 5:
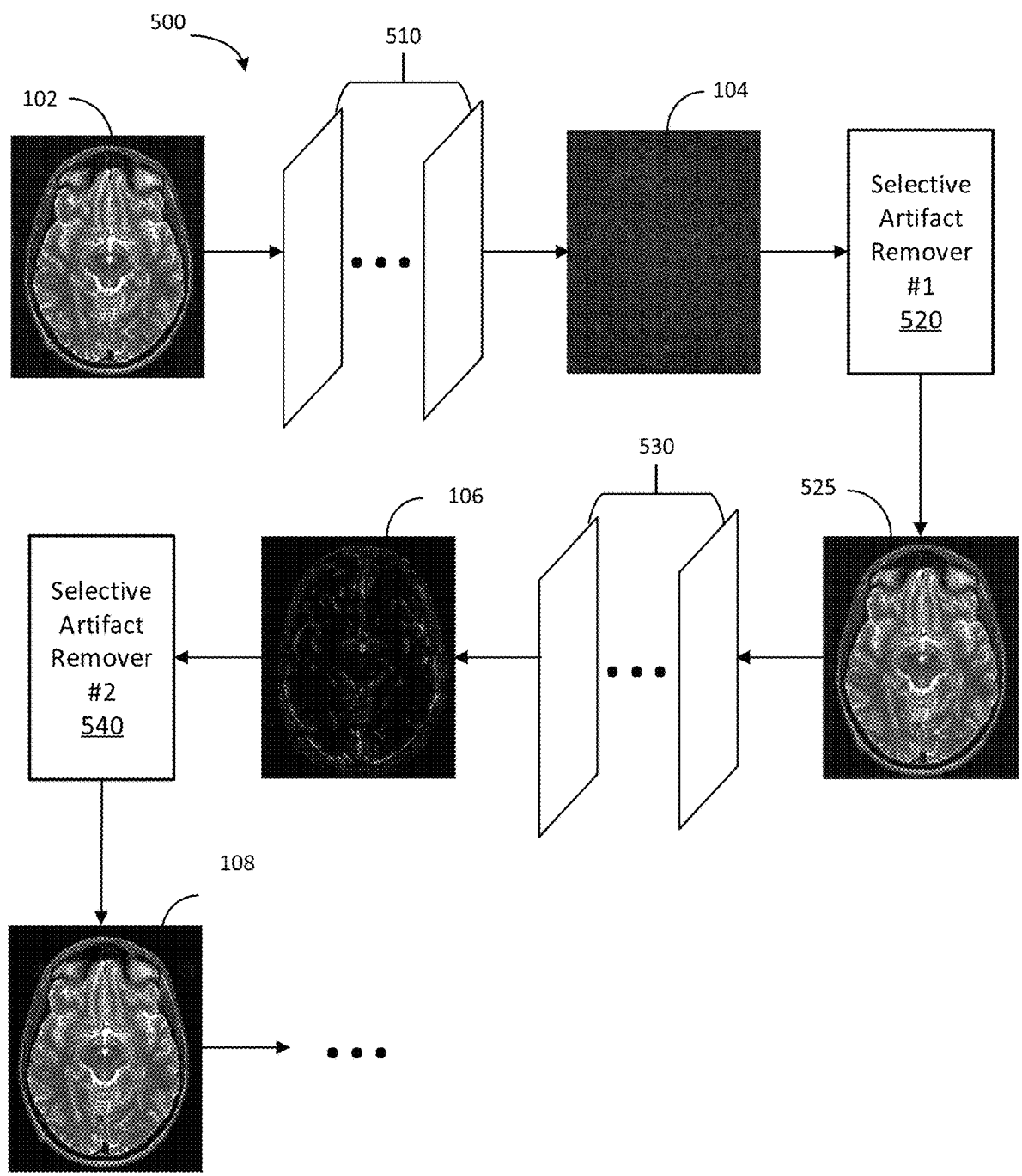
FIG. 5 is a schematic diagram illustrating a system for selectively denoising a medical image, according to another exemplary embodiment.

Referring to FIG. 5, a system 500 for selectively denoising a medical image is shown according to another exemplary embodiment. The first deep learning network 510 includes multiple convolutional layers and has been trained to single out the first type of artifacts. The input image 102 is received by the first deep learning network 510 which extracts and outputs the first type of artifacts 104. The first selective artifact remover 520 is configured to remove the first type of artifacts 104 from the input image 102 to a first extent, for example, according to a first scale factor $\lambda_1$. The resulting image 525 is then input to the second deep learning network 530, which includes multiple convolutional layers and have been trained to single out the second type of artifacts. The second deep learning network 540 extracts and outputs the second type of artifacts 106. The second selective artifact remover 540 is configured to remove the second type of artifacts 106 to a second extent, for example, according to a second scale factor $\lambda_2$. The first and second scale factors $\lambda_1$ and $\lambda_2$ can be set in the similar way to those described with reference to FIG. 1. It should be understood that although two deep learning networks 510 and 530 stacked in series are shown in FIG. 5 as an example, the system 500 may include more than two stacked deep learning networks to process various types of artifacts.

The deep learning networks 510 and 530 may be trained using corrupted medical images and artifacts present in corresponding images. As discussed above, in some embodiments, the corrupted medical images may be synthesized images. For example, the corrupted images may be acquired by adding various artifacts to a clean image. Because a series of stacked (i.e., sequential) deep learning networks are used, the training for one is closely related to training for another.

Figure 6:
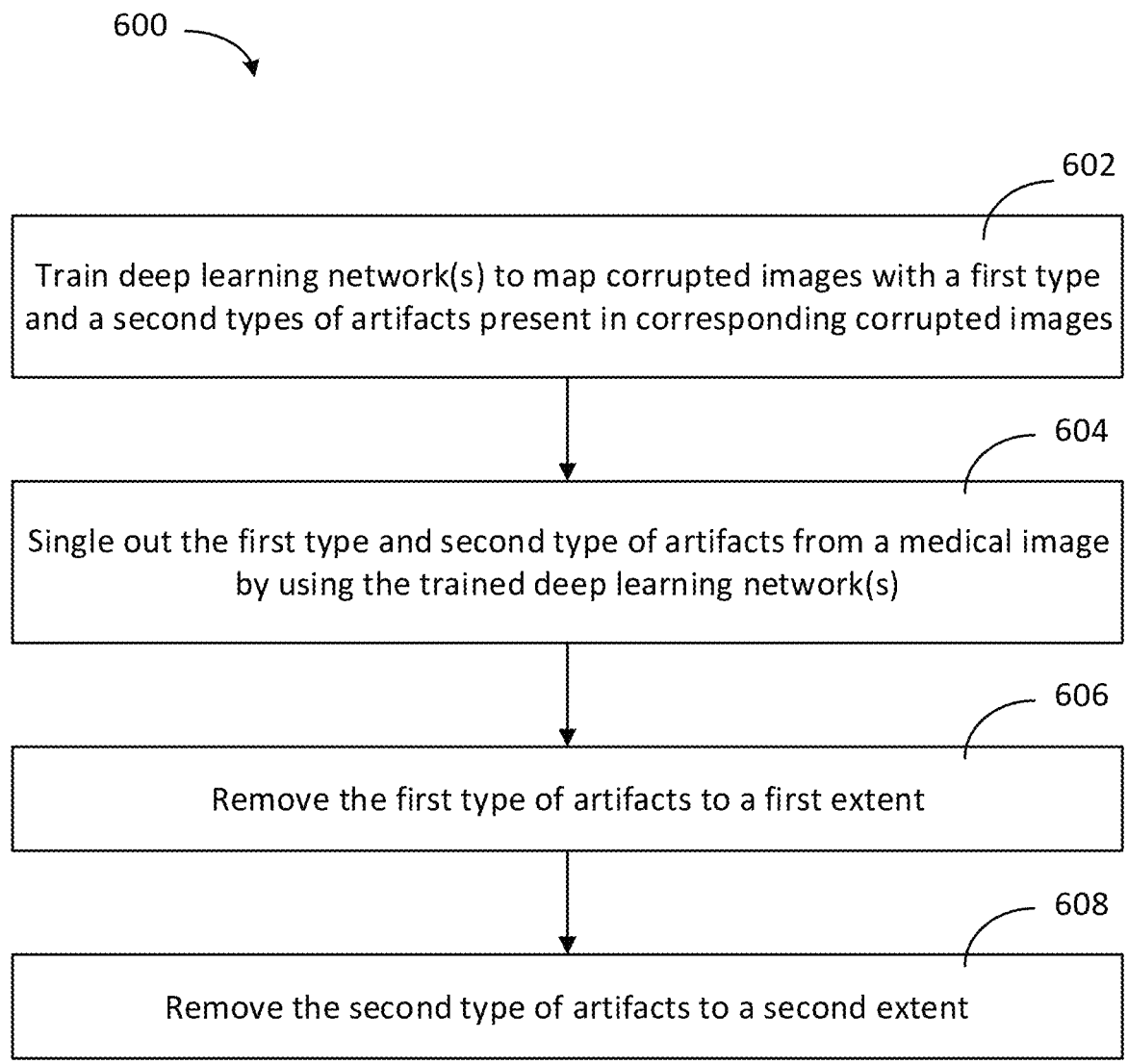
FIG. 6 is a flow chart illustrating a method for selectively denoising a medical image, according to an exemplary embodiment.

Referring to FIG. 6, a flow chart of a method 600 for selectively denoising a medical image is shown, according to an exemplary embodiment. Method 600 may be implemented by the system 100 shown in FIG. 1 or the system 500 shown in FIG. 5. In some embodiments, method 600 may be implemented as executable instructions in an imaging device, an edge device connected to the imaging device, a cloud in communication with the imaging device, or any appropriate combination thereof.

At an operation 602, one or more deep learning networks are trained to map corrupted images onto a first type and a second type of artifacts present in corresponding corrupted images. In some embodiments, one or more deep learning networks include a residual neural network. For example, the deep learning network may include a first branch of convolutional layers configured to extract characteristics related to the first type of artifacts and a second branch of convolutional layers configured to extract characteristics related to the second type of artifacts. The two branches may share one or more convolutional layers, as shown in FIG. 2, or not share any layers, as shown in FIG. 4. In some embodiments, there are multiple deep learning networks stacked in series, characteristics related to the first type of artifacts are output from one of the stacked deep learning networks, and characteristics related to the second type of artifacts are output form another of the stacked deep learning networks, as shown in FIG. 5.

Various types of artifacts may include, for example, motion-related artifacts caused by voluntary and/or physiologic motion of the patient under examination (e.g., blurring, ghosts), alias artifacts caused by inadequate digital sampling rate (e.g., phase wrap-around), Gibbs ringing caused by incomplete digitization of the MR echo, RF noise artifacts caused by failure of the RF shielding that prevents external noise from getting into the detector, random noise, flow artifacts, chemical shift, spatial warping, and so on.

The deep learning network may be trained using corrupted medical images and artifacts present in corresponding images. In some embodiments, the corrupted medical images may be synthesized images. For example, noise can be added to a clean image to generate the synthesized image. The specific type of noise depends on the imaging modality. The deep learning network is trained to map the synthesized image onto the additive noise.

As another example, Gibbs ringing can be introduced to a high resolution image by downsampling the image. Specifically, an image with Gibbs ringing is generated from a high resolution image free of Gibbs ringing by retrospectively reducing the acquisition window to a point where the signal is non zero. The deep learning network is trained to map the image with Gibbs rings onto the difference between the image with Gibbs rings and the image without Gibbs rings.

At an operation 604, one or more trained deep learning networks are used to single out the first and second types of artifacts from a given medical image. Particularly, characteristics related to the first type of artifacts and characteristics related to the second type of artifacts can be output from separate channels or separate layers of the one or more deep learning networks. The medical image may be acquired with any appropriate imaging modality, such as MRI, CT, PET, X-ray, ultrasound, etc., and may be any appropriate type of image. The medical image may be a magnitude image, phase image, "real value" image, "imaginary value" image, or "complex value" image, for MRI. In some embodiments, the medical image is obtained by performing Fourier transform on acquired k-space data. In some embodiments, the acquired k-space data is pre-processed (e.g., auto-calibrated) before the Fourier transform. In some embodiments, the medical image is obtained by further processing the Fourier transformed dataset, which may include any appropriate processing (or combination thereof) in the reconstruction pipeline, such as sensitivity encoding (e.g., array coil spatial sensitivity encoding), water-fat separation, gradient nonlinearity correction, and so on. The medical image may be of any appropriate size, for example, 128×128 pixels, 256×256 pixels, 512×512 pixels, and so on.

At an operation 606, the first type of artifacts is removed to a first extent. At an operation 608, the second type of artifacts is removed to a second extend. The first and second extents can be different. As discussed above, in some embodiments, a first and second two scale factors $\lambda_1$ and $\lambda_2$ may be used to describe the first and second extents, respectively. $\lambda_1$ and $\lambda_2$ can be of different values, and thus the first and second types of artifacts can be removed at different extents. In some embodiments, $\lambda_1$ and $\lambda_2$ can be any value in the range of [0, 1]. If, for example, $\lambda_1=1$, $\lambda_2=0.5$, the first type of artifacts (e.g., noise) is fully suppressed while the second type of artifacts (e.g., ringing) is partially removed.

In some embodiments, at least one of the scales factors $\lambda_1$ and $\lambda_2$ may vary for different pixels across the image rather than remaining the same for each pixel. For example, $\lambda_1$ and/or $\lambda_2$ may be set as 1 for pixels in some portions of the image while 0 for pixels in other portions of the image. $\lambda_1$ and/or $\lambda_2$ may be set so that residual with higher value is removed to a higher extent than residual with lower value, or vice versa. $\lambda_1$ and $\lambda_2$ may adopt any appropriate functions.

In some embodiments, the scale factors (and thus the extents for removing the various types of artifacts) are specified by an operator during acquisition of the images. In some embodiments, the scale factors are pre-defined depending on the applications, such as anatomy, pulse sequence, etc. For example, if radial sampling of k-space data is used, the scale factor for motion blurring may be set at a low value or zero. If Cartesian sampling of k-space data is used, the scale factor for motion blurring may be set at a high value or one. In some embodiments, the scale factors are adapted/learned according to a model. For example, the scale factor associated with random noise may be adapted for various scanning parameters (e.g., FOV, bandwidth, etc.) according to a thermal/electronics noise model for the imaging device. The residuals can then be fully or partially removed from the input image to produce an enhanced image. The original image is being enhanced by removing a scaled version of two corruptions.

One or more specific embodiments of the present disclosure are described above in order to provide a thorough understanding. These described embodiments are only examples of systems and methods for selectively denoising a medical image by using a deep learning network. The skilled artisan will understand that specific details described in the embodiments can be modified when being placed into practice without deviating the spirit of the present disclosure.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

What is claimed is:

1. A method for selectively denoising a medical image, the method comprising:
   singling out a first type and a second type of artifacts from the medical image by using one or more trained deep learning networks;
   removing the first type of artifacts to a first extent; and
   removing the second type of artifacts to a second extent;
   generating an enhanced image having the first type of artifacts removed to the first extent and having the second type of artifacts removed to the second extent; and
   wherein the first and second type of artifacts are removed according to the following equation:

$$B(x,y)=I(x,y)-\lambda_1 A_1(x,y)-\lambda_2 A_2(x,y),$$

where E(x,y) is a pixel value at location (x,y) of the enhanced image, I(x,y) is a pixel value of the medical image, $A_1(x,y)$ and $A_2(x,y)$ are pixel values of the first and second type of artifacts respectively and $\lambda_1$ and $\lambda_2$ represent the first and the second extents respectively.

2. The method of claim 1, wherein the medical image is a magnetic resonance (MR) image, computed tomography (CT) image, positron emission tomography (PET) image, X-ray image, or ultrasound image.

3. The method of claim 1, wherein the first and second type of artifacts are any two of noise, blurring, Gibbs ringing, truncation artifacts, motion related artifacts, flow artifacts, chemical shift, spatial warping, and alias artifacts.

4. The method of claim 1, wherein the first and second type of artifacts are any two of acoustic reverberation, noise, speckle, streaking, and blurring.

5. The method of claim 1, wherein the first and second type of artifacts are any two of streaking, noise, beam hardening, and scatter.

6. The method of claim 1, wherein the first extent is different than the second extent.

7. The method of claim 1, wherein the first extent is defined by a first scale factor, the second extent is defined by a second scale factor, at least one of the first and second scale factors vary for different pixels of the medical image.

8. The method of claim 7, further comprising:
   generating the corrupted images by adding at least one of the first type of artifacts and the second type of artifacts to clean images; and
   feeding the corrupted images and the added artifacts to the one or more deep learning networks.

9. The method of claim 1, further comprising:
   singling out a third type of artifacts from the medical image by using the one or more trained deep learning networks; and
   removing the third type of artifacts to a third extent.

10. The method of claim 1, further comprising:
    training the one or more deep learning networks to map corrupted images onto the first and second types of artifacts present in corresponding corrupted images.

11. A system for denoising a medical image, the system comprising:
    a memory storing a first scale factor and a second scale factor; and
    a processor communicably coupled to the memory and configured to:
       single out a first type and a second type of artifacts from the medical image by using one or more trained deep learning networks;
       remove the first type of artifacts according to the first scale factor;

remove the second type of artifacts according to the second scale factor;

generate an enhanced image having the first type of artifacts removed to the first extent and having the second type of artifacts removed to the second extent; and wherein the first and second type of artifacts are removed according to the following equation:

$$E(x,y)=I(x,y)-\lambda_1 A_1(x,y)-\lambda_2 A_2(x,y),$$

where $E(x,y)$ is a pixel value at location $(x,y)$ of the enhanced image, $I(x,y)$ is a pixel value of the medical image, $A_1(x,y)$ and $A_2(x,y)$ are pixel values of the first and second type of artifacts respectively and $\lambda_1$ and $\lambda_2$ are the first and the second scale factors respectively.

12. The system of claim 11, wherein the first scale factor is different than the second scale factor.

13. The system of claim 11, wherein at least one of the first and second scale factors vary for different pixels of the medical image.

14. The system of claim 11, wherein the memory stores a third scale factor, the processor is further configured to:

single out a third type of artifacts from the medical image by using the one or more trained deep learning networks; and remove the third type of artifacts according to the third scale factor.

15. The system of claim 11, wherein the memory further stores the one or more trained deep learning networks.

16. The system of claim 15, wherein the one or more trained deep learning networks are one deep learning network comprising:

a first branch of convolutional layers configured to extract characteristics related to the first type of artifacts; and a second branch of convolutional layers configured to extract characteristics related to the second type of artifacts, wherein the first and second branches share one or more convolutional layers.

17. The system of claim 15, wherein the one or more trained deep learning networks are one deep learning network comprising:

a first branch of convolutional layers configured to extract characteristics related to the first type of artifacts; and a second branch of convolutional layers configured to extract characteristics related to the second type of artifacts, wherein the first and second branches do not share any convolutional layers.

18. The system of claim 15, wherein the one or more trained deep learning networks comprises two deep learning networks stacked in series, characteristics related to the first type of artifacts are output from one of the two deep learning networks, and characteristics related to the second type of artifacts are output form the other one of the two deep learning networks.

* * * * *